(12) United States Patent
Tanaka et al.

(10) Patent No.: US 10,294,961 B2
(45) Date of Patent: May 21, 2019

(54) CYLINDRICAL CASE

(71) Applicants: IHI CORPORATION, Koto-ku (JP); IHI AEROSPACE CO., LTD., Koto-ku (JP)

(72) Inventors: Agamu Tanaka, Tokyo (JP); Yuji Mori, Tokyo (JP); Takashi Harada, Tokyo (JP); Ikuo Okumura, Tokyo (JP); Kenji Ishimoto, Tokyo (JP)

(73) Assignees: IHI CORPORATION, Koto-ku (JP); IHI AEROSPACE CO., LTD., Koto-ku (JP)

( * ) Notice: Subject to any disclaimer, the term of this patent is extended or adjusted under 35 U.S.C. 154(b) by 203 days.

(21) Appl. No.: 15/369,301

(22) Filed: Dec. 5, 2016

(65) Prior Publication Data

US 2017/0082118 A1   Mar. 23, 2017

Related U.S. Application Data

(63) Continuation of application No. PCT/JP2014/072002, filed on Aug. 22, 2014.

(51) Int. Cl.
*F02K 3/06* (2006.01)
*F04D 29/02* (2006.01)
(Continued)

(52) U.S. Cl.
CPC .......... *F04D 29/522* (2013.01); *F01D 25/24* (2013.01); *F02K 1/70* (2013.01); *F02K 3/06* (2013.01);
(Continued)

(58) Field of Classification Search
CPC ...... F01D 25/24; F01D 25/243; F01D 25/246; F02K 1/64; F02K 1/68; F02K 3/06; F04D 29/526; F05D 2260/36; F05D 2300/174
See application file for complete search history.

(56) References Cited

U.S. PATENT DOCUMENTS 8,021,102 B2 *  9/2011  Xie ................ B29C 70/086
                                          29/889.2
8,668,864 B2 *  3/2014  Maheshwari ...... B32B 5/28
                                          264/241
(Continued)

FOREIGN PATENT DOCUMENTS

JP       58-56236 U      4/1983
JP      2000-117844      4/2000
(Continued)

OTHER PUBLICATIONS

International Search Report dated Oct. 7, 2014 in PCT/JP2014/072002, filed on Aug. 22, 2014 (with English Translation).

*Primary Examiner* — Kenneth Bomberg
*Assistant Examiner* — Jose M Siguenza, Jr.
(74) *Attorney, Agent, or Firm* — Oblon, McClelland, Maier & Neustadt, L.L.P.

(57) ABSTRACT

A cylindrical case main body, and a connecting ring body fitted and fixed to a first end of the case main body and having an annular groove open in the centrifugal direction, are provided. The connecting ring body has a notch open to a side opposite to a second end of the case main body. Into the notch of the connecting ring body, a reinforcement body is fitted, and the reinforcement body has an arc-shaped groove continuing to the annular groove of the connecting ring body in a state where the reinforcement body is fitted into the notch of the connecting ring body. In addition to attaining high rigidity, reduction in weight and reduction in manufacturing cost can also be achieved.

8 Claims, 6 Drawing Sheets

(51) Int. Cl.
  *F02K 1/64* (2006.01)
  *F01D 25/24* (2006.01)
  *F04D 29/52* (2006.01)
  *F02K 1/70* (2006.01)
(52) U.S. Cl.
  CPC ........ *F04D 29/023* (2013.01); *F05D 2230/53* (2013.01); *F05D 2240/91* (2013.01); *F05D 2260/30* (2013.01); *F05D 2260/36* (2013.01); *F05D 2300/173* (2013.01); *F05D 2300/174* (2013.01); *F05D 2300/603* (2013.01); *Y02T 50/672* (2013.01)

(56) References Cited

U.S. PATENT DOCUMENTS

| | | | |
|---|---|---|---|
| 8,672,609 B2 * | 3/2014 | Lussier | F01D 21/045 415/197 |
| 9,114,882 B2 * | 8/2015 | Robertson, Jr. | B64D 27/26 |
| 9,677,425 B2 * | 6/2017 | Lavignotte | F02K 1/70 |
| 9,920,654 B2 * | 3/2018 | Dubois | B64D 29/06 |
| 2007/0086854 A1 | 4/2007 | Blanton | |
| 2008/0115454 A1 | 5/2008 | Xie | |
| 2009/0155070 A1 | 6/2009 | Duchatelle et al. | |
| 2012/0305172 A1 | 12/2012 | Maheshwari et al. | |
| 2015/0064000 A1 | 3/2015 | Yagi et al. | |
| 2016/0290360 A1 | 10/2016 | Tanaka et al. | |

FOREIGN PATENT DOCUMENTS

| | | |
|---|---|---|
| JP | 2007-113573 | 5/2007 |
| JP | 2008-128250 | 6/2008 |
| JP | 2009-150385 | 7/2009 |
| JP | 2012-251551 A | 12/2012 |
| JP | 6118721 B2 | 4/2017 |
| WO | WO 2013/115349 A1 | 8/2013 |

* cited by examiner

CYLINDRICAL CASE

TECHNICAL FIELD

Embodiments described herein relate to a cylindrical case to be used as a fan case covering fan blades of an aircraft jet engine, for example.

BACKGROUND ART

As such a cylindrical case described above, a cylindrical case disclosed, for example, in Patent Document 1 is known. This cylindrical case is a fan case covering fan blades of an aircraft jet engine, and includes an intermediate casing and an extension connected to the engine rear side of the intermediate casing.

The extension includes a cylindrical joining shell arranged on the engine front side, and a downstream end arranged on the engine rear side. The downstream end is formed by annularly connecting a plurality of angular sectors, and in a state that the angular sectors are connected annularly, an annular groove for connecting nacelle covers is formed.

The downstream end is formed by arranging two types of angular sectors alternately. An angular sector made of an Al alloy is arranged at a position where the level of reverse thrust transmitted by the nacelle covers is relatively low, while an angular sector made of a wear-resistant Ti alloy is arranged at a position where the level of reverse thrust transmitted by the nacelle covers is higher.

In this case, both the two types of angular sectors are connected to an end of the joining shell by fixing outward flanges formed on both the joining shell and the angular sectors to each other with screws in the axial direction.

RELATED ART DOCUMENT

Patent Document
Patent Document 1: Japanese Patent Laid-Open No. 2009-150385

SUMMARY OF THE DISCLOSURE

Problems to be Solved by the Disclosure

However, in the conventional fan case described above, as the downstream end of the extension connected with the intermediate casing is formed by annularly connecting a plurality of angular sectors, even though angular sectors made of an Al alloy and angular sectors made of a Ti alloy are arranged alternately according to the level of reverse thrust, it is difficult to say that high rigidity can be achieved.

Further, as the two types of angular sectors constituting the extension are connected with an end of the joining shell by outward flanges and screws, an increase in weight is unavoidable. In order to address this issue, in the case of attempting to reduce weight by forming a lightening hole in the angular sector made of an Al alloy, the manufacturing cost increases by the work. These have been problems to be solved.

The present disclosure has been made by paying attention to the conventional problems described above. An object of the present disclosure is to provide a cylindrical case with high rigidity which enables reduction in weight and reduction in manufacturing cost.

Means for Solving the Problems

In order to achieve the above object, the present disclosure is directed to a configuration comprising a cylindrical case main body, and a connecting ring body fitted and fixed to an outer circumferential side of a peripheral wall at one end of the case main body and having an annular groove open in the centrifugal direction, wherein the connecting ring body has a fitting portion, a reinforcement body is fitted to the fitting portion of the connecting ring body, and the reinforcement body has an arc-shaped groove continuing to the annular groove of the connecting ring body in a state where the reinforcement body is fitted to the fitting portion of the connecting ring body.

In the cylindrical case according to the present disclosure, in the case of a fan case having an annular groove receiving a reverse thrust load from a reverse thrust transmission body, a connecting ring body for connecting with the reverse thrust transmission body is formed as a monolithic body, and then, a reinforcement body bearing a larger reverse thrust load is fitted to a fitting portion of the connecting ring body. As such, high rigidity can be achieved in the connecting ring body as a whole.

Further, as the reinforcement body is fitted to the fitting portion of the connecting ring body, even if the reinforcement body is connected with the connecting ring body with flanges and screws, an increase in weight can be suppressed and manufacturing cost can be reduced by the amount that a work for forming a lightening hole to reduce weight is unnecessary, compared with the conventional case of connecting all of the two types of angular sectors to a joining shell with flanges and screws.

Effects of the Disclosure

The cylindrical case according to the present disclosure provides excellent effects that it is possible to achieve reduction in weight and reduction in manufacturing cost, in addition to high rigidity.

MODE FOR CARRYING OUT THE DISCLOSURE

Hereinafter, the present disclosure will be described based on the drawings.

FIGS. 1 to 6 show an embodiment of a cylindrical case according to the present disclosure. In this embodiment, description will be given on an example in which a cylindrical case according to the present disclosure is a fan case covering fan blades of an aircraft jet engine.

Figure 1:
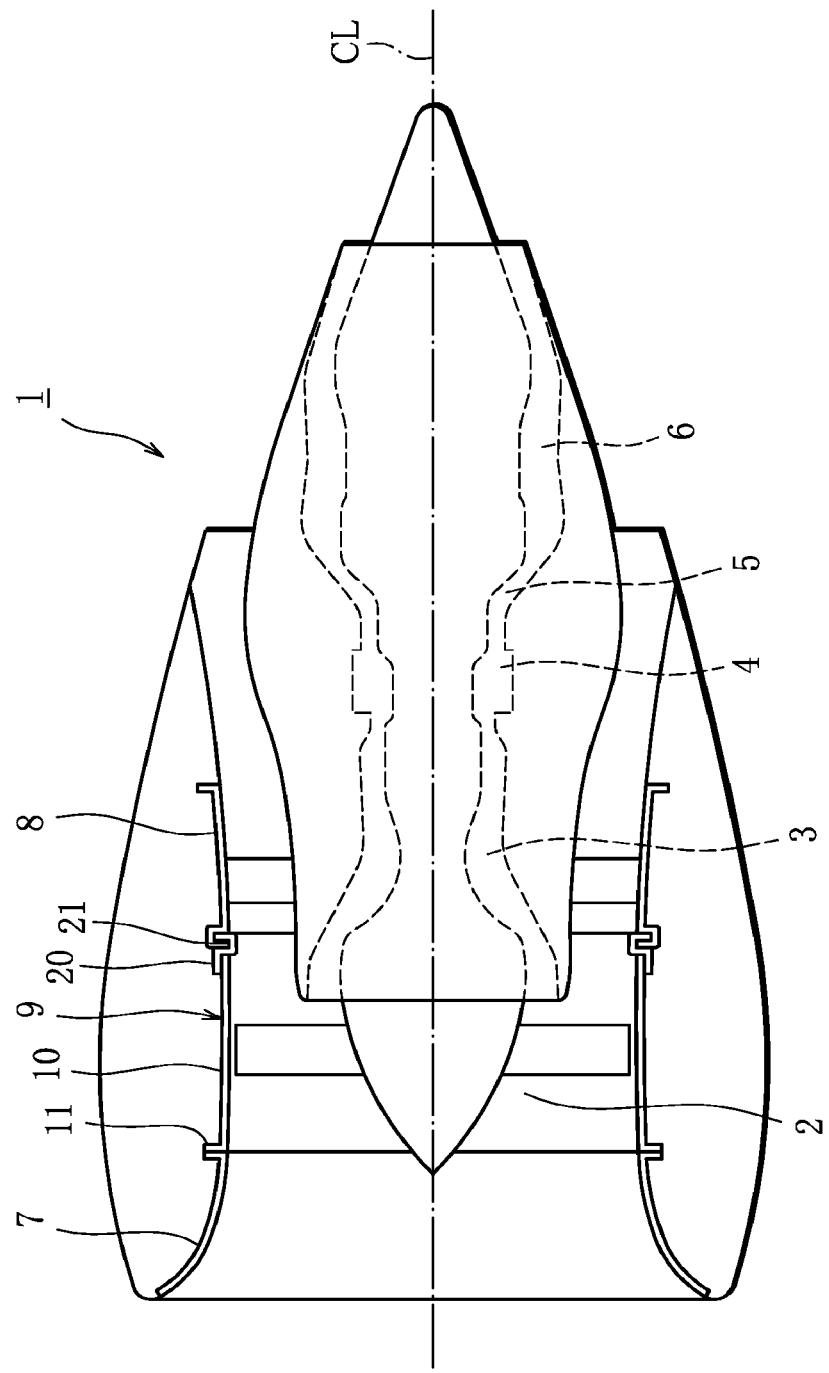
FIG. 1 is a schematic explanatory sectional view of an aircraft jet engine adopting a cylindrical case according an embodiment of the present disclosure as a fan case.

As shown in FIG. 1, an aircraft jet engine 1 is configured such that air taken from the front side (left side in the drawing) is sent to a compressor 3 by a fan 2 having a plurality of fan blades, fuel injected into the air compressed by the compressor 3 is burned in a combustion chamber 4, and with expansion of the hot gas caused therefrom, a high-pressure turbine 5 and a low-pressure turbine 6 are rotated.

Figure 2:
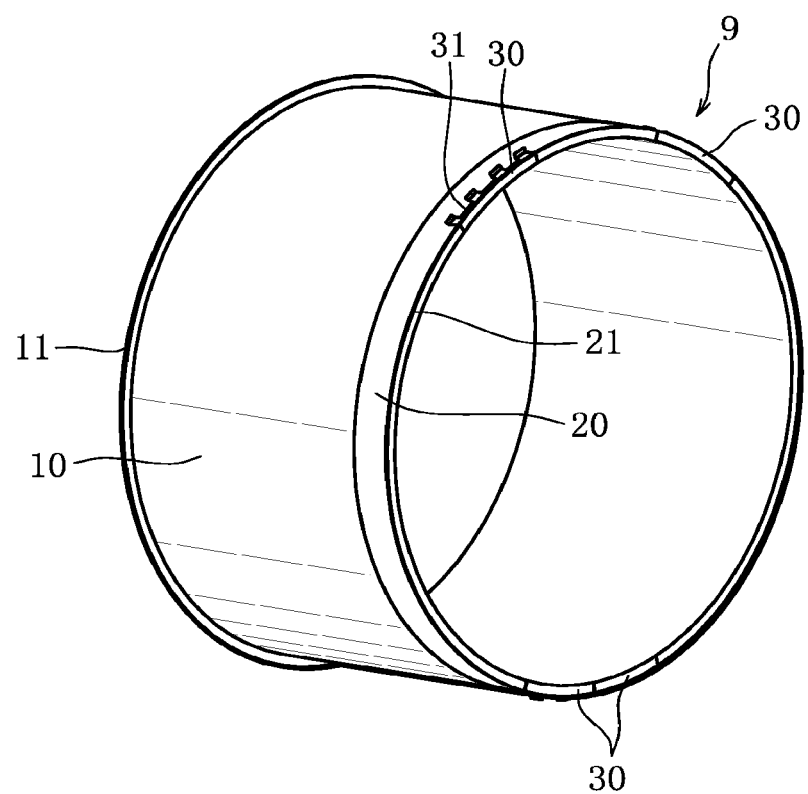
FIG. 2 is an overall explanatory perspective view of the fan case in FIG. 1.

A fan case 9, covering the fan blades of the fan 2, includes, as shown in FIG. 2, a cylindrical case main body 10 made of a composite material in which reinforced fiber is impregnated with thermosetting resin.

It should be noted that as the reinforced fiber of the composite material constituting the case main body 10 of the fan case 9, carbon fiber, glass fiber, organic fiber (aramid, PBO, polyester, polyethylene), alumina fiber, or silicon carbide fiber may be used, for example. Further, as a matrix, polyester resin, epoxy resin, vinylester resin, phenol resin, bismaleimide resin, oxazoline resin, or melamine resin may be used as thermosetting resin, for example.

On the front end (left end in the drawing) of the case main body 10, an outward annular flange 11 connectable with an engine cowl 7 is formed, and on the rear end (right end in the drawing), a connecting ring body 20 made of an Al alloy is fixed in a fitted state. The connecting ring body 20 has an annular groove 21, open to the centrifugal side, formed so as to protrude from the rear end of the case main body 10 in the axial CL direction. The annular groove 21 receives a metal inward flange of a reverse thrust transmission body 8 in a fitting manner.

Figure 6:
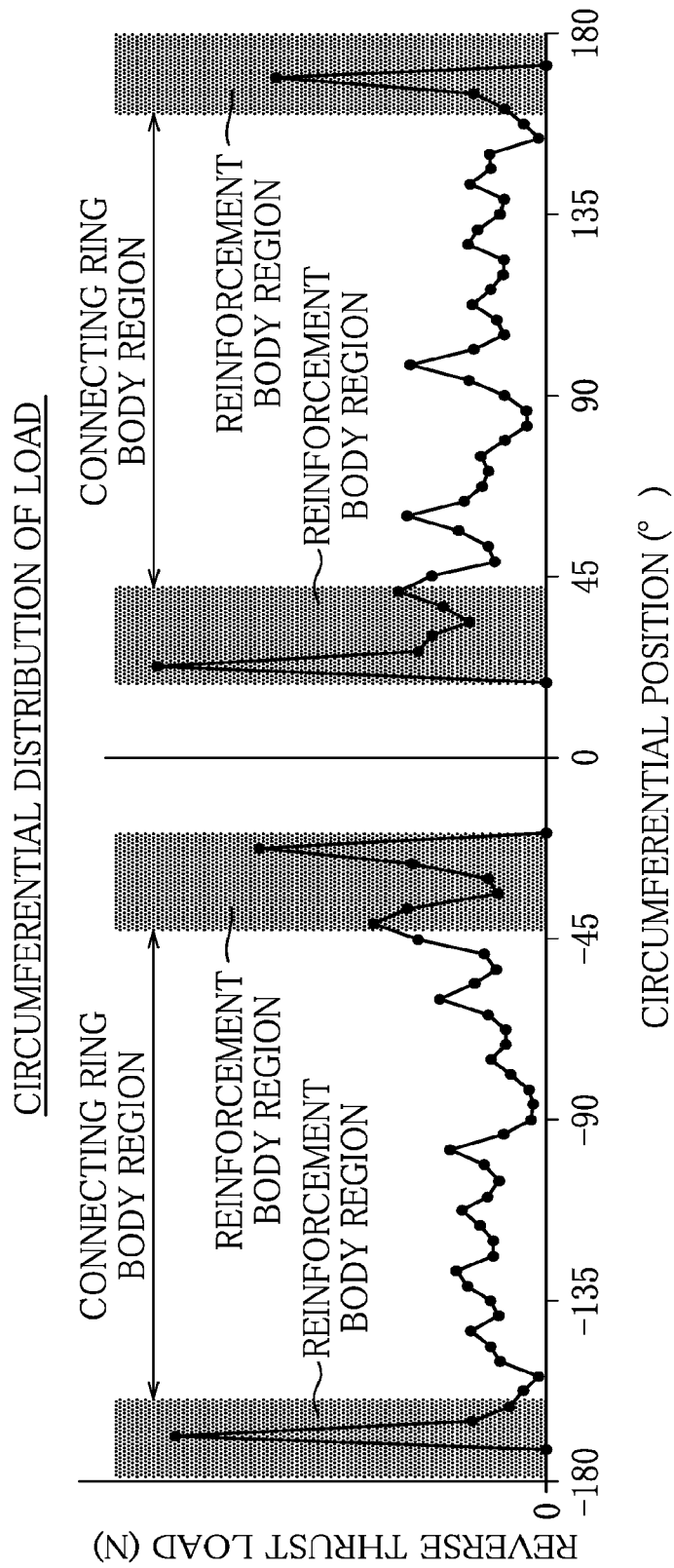
FIG. 6 is a graph showing distribution of a reverse thrust load in a circumferential direction when a reverse thrust load is applied on the case main body of the fan case shown in FIG. 2.

On the annular groove 21 of the connecting ring body 20, a reverse thrust load from a thrust reverser, not shown, is applied through the reverse thrust transmission body 8. The reverse thrust load is not applied uniformly in the circumferential direction in the case main body 10 connected with the reverse thrust transmission body 8. For example, as shown in FIG. 6, the reverse thrust load is applied more on a top vertex region (region of ±20° to 45° on both sides of the vertex) and near a bottom vertex region (region of ±165° to 180° including the vertex) in the circumferential direction.

Figure 3:
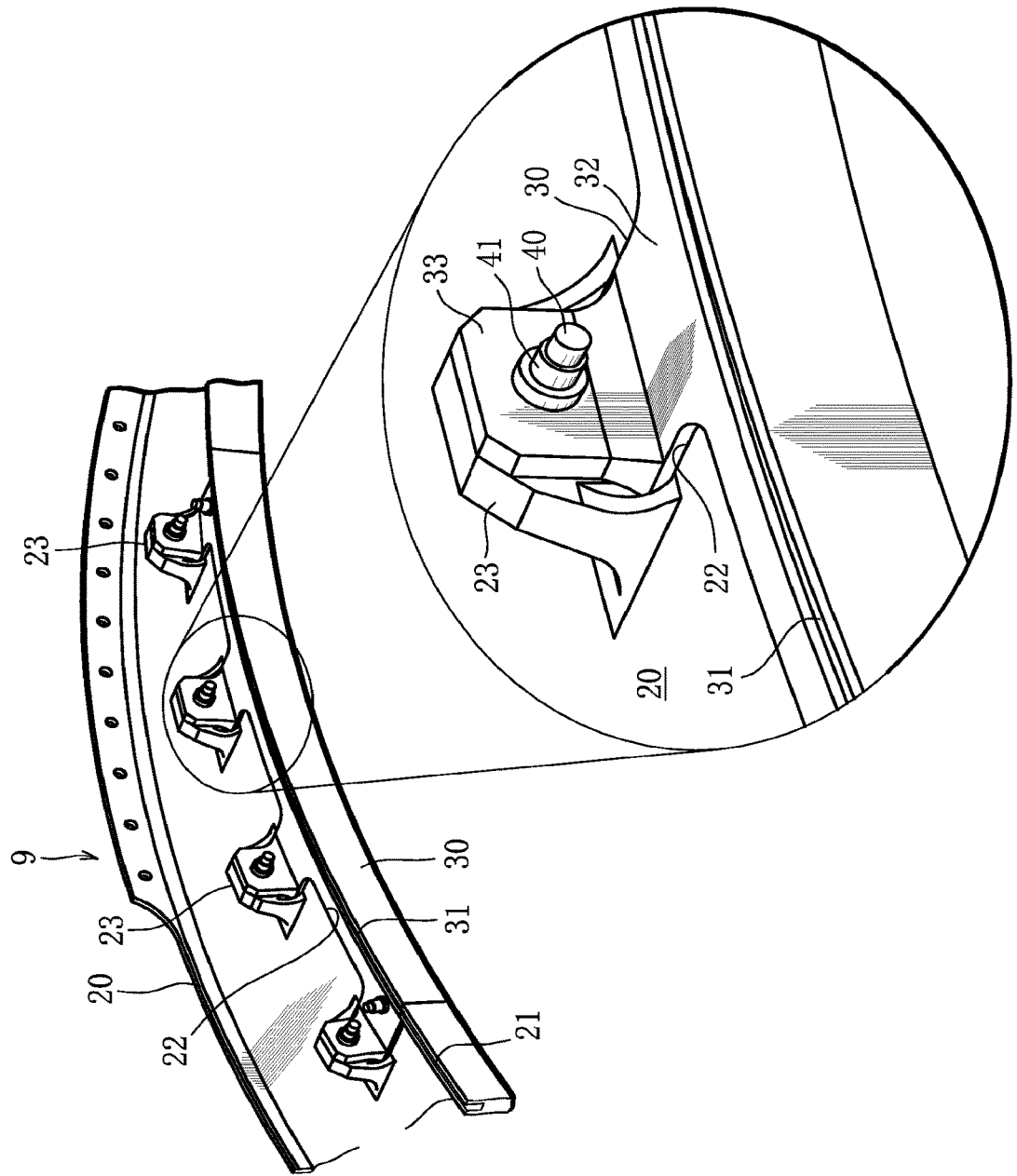
FIG. 3 is a partial explanatory perspective view of a top vertex region of a connecting ring body, showing a state where a reinforcement body is fixed to the connecting ring body of the case main body of the fan case shown in FIG. 2 in an enlarged manner.
Figure 4:
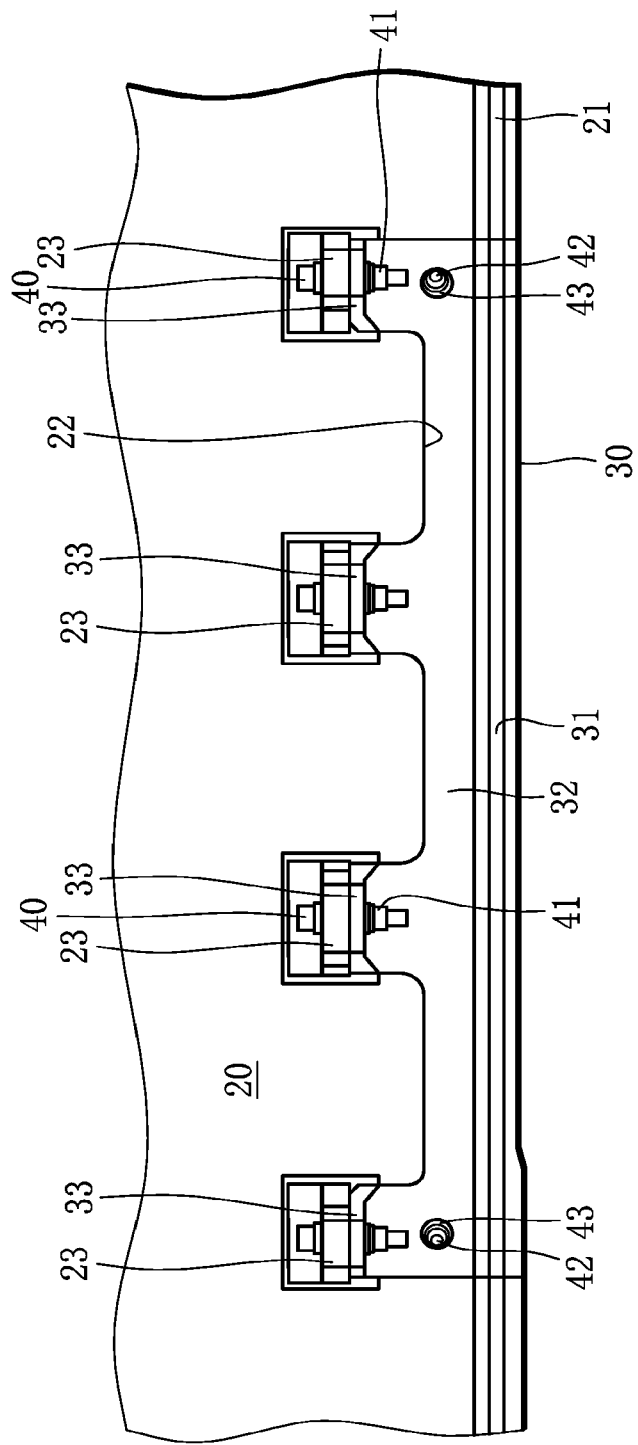
FIG. 4 is a partial explanatory plan view of a top vertex region of a connecting ring body, showing a state where the reinforcement body is fixed to the connecting ring body of the case main body of the fan case shown in FIG. 2 in an enlarged manner.

As such, in that case, reinforcement bodies 30 made of a Ti alloy, each having an arc-shaped groove 31 continuing to the annular groove 21 of the connecting ring body 20, are arranged on regions of four portions in total, that is, regions of two portions near the top vertex and regions of two portions near the bottom vertex of the connecting ring body 20. As shown in FIGS. 3 and 4, the reinforcement bodies 30 are fitted into notches (fitting portion) 22 formed in the regions of the four portions of the connecting ring body 20 so as to constitute a part of the monolithic connecting ring body 20.

This means that a large reverse thrust load applied on the regions of the four portions (reinforcement body regions) is born by the arc-shaped grooves 31 of the reinforcement bodies 30 made of a Ti alloy, and a reverse thrust load applied on the region other than the regions of the reinforcement bodies 30 (region of the connecting ring body 20) is born by the annular groove 21 of the connecting ring body 20 made of an Al alloy.

Figure 5:
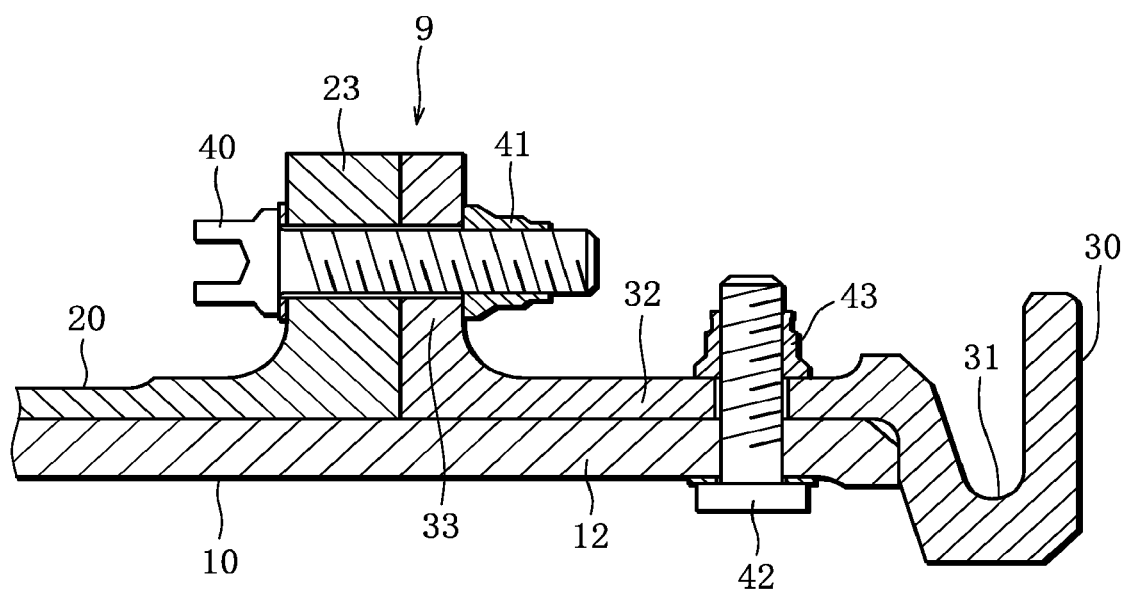
FIG. 5 is a partial explanatory sectional view of a top vertex region of a connecting ring body, showing a state where the reinforcement body is fixed to the connecting ring body of the case main body of the fan case shown in FIG. 2 in an enlarged manner.

In this case, as also shown in FIG. 5, the reinforcement body 30 has a plurality of vertical walls 33 at an end of a side opposite to the arc-shaped groove 31 of a reinforcement body main body 32 in contact with a peripheral wall 12 at the rear end of the case main body 10. The reinforcement body 30 is configured such that the vertical walls 33 are superposed with a plurality of outward receiving walls 23 formed on the connecting ring body 20 and are fixed with bolts 40 and nuts 41, respectively, to thereby be integrated with the connecting ring body 20 in a state where the reinforcement body 30 is positioned in the axial CL direction and the radial direction of the case main body 10, respectively.

It should be noted that the reinforcement body main body 32 of the reinforcement body 30 is fixed to the peripheral wall 12 at the rear end of the case main body 10 with the bolts 42 and the nuts 43 to thereby prevent jumping up of both ends of the reinforcement body 30.

In the case of manufacturing the fan case 9 described above, first, the cylindrical case main body 10 is molded with a composite material in which reinforced fiber is impregnated with thermosetting resin (details are omitted).

Next, to the outer circumferential side of the peripheral wall 12 at the rear end of the cylindrical case main body 10, the connecting ring body 20 made of an Al alloy is fitted and fixed.

Then, on the peripheral wall 12 at the rear end of the case main body 10, the reinforcement body 30 made of a Ti alloy having the arc-shaped groove 31 is fitted into a notch 22 formed in a reinforcement body region of the connecting ring body 20 having been fixed, so as to be integrated with the connecting ring body 20. Then, the vertical wall 33 of the reinforcement body 30 is brought into contact with the outward receiving wall 23 formed on the connecting ring body 20 and is fixed with the bolt 40 and the nut 41, whereby positioning of the reinforcement body 30 with respect to the case main body 10 in the axial CL direction and the radial direction is performed, respectively.

Thereafter, a series of groove finishing is performed on the annular groove 21 of the connecting ring body 20 and the arc-shaped groove 31 of the reinforcement body 30 which are continuing to each other through positioning of the reinforcement body 30 with respect to the case main body 10 in the axial CL direction and the radial direction, respectively.

In this way, in the fan case 9 according to the present embodiment, as the cylindrical case main body 10 is made of reinforced fiber such as carbon fiber, the strength and the rigidity of the entire fan case 9 are secured.

Further, in the fan case 9 according to the present embodiment, as the connecting ring body 20 for connecting with the reverse thrust transmission body 8 is formed as a monolithic body and the reinforcement body 30 bearing a larger reverse thrust load is fitted into the notch 22 of the connecting ring body 20, high rigidity can be achieved in the connecting ring body 20 as a whole.

Further, in the fan case 9 according to the present embodiment, the notches 22 are formed in the regions of four portions in total, that is, regions of two portions near the top vertex of the connecting ring body 20 and regions of two portions near the bottom vertex, and then the reinforcement bodies 30 are fitted into these notches 22. Then, as described above, the vertical walls 33 of the reinforcement body 30 are brought into contact with the outward receiving walls 23 of the connecting ring body 20 and are fixed with the bolts 40 and the nuts 41. As such, even though the reinforcement body 30 is connected with the connecting ring body 20, an increase in weight can be suppressed, and the manufacturing cost can be reduced by the amount that a work for forming lightening holes to reduce weight is unnecessary, compared with the conventional case where all of the two types of angular sectors are connected to a joining shell with flanges and screws.

Furthermore, in the fan case 9 according to the present embodiment, the reinforcement body 30 is fitted into the notches 22 of the connecting ring body 20 fitted and fixed to the rear end of the case main body 10, and then the vertical walls 33 of the reinforcement body 30 are brought into contact with the outward receiving walls 23 of the connecting ring body 20 and are fixed with the bolts 40 and the nuts 41. As such, positioning of the reinforcement body 30 with respect to the case main body 10 in the axial CL direction and the radial direction, respectively, is made with high accuracy, and the annular groove 21 of the connecting ring body 20 and the arc-shaped groove 31 of the reinforcement body 30 continue to each other with high accuracy as well.

Accordingly, in the fan case 9 according to the present embodiment, the reinforcement bodies 30 made of a Ti alloy can be arranged at positions where a reverse thrust load, which is larger than the reverse thrust load applied on the connecting ring body 20, is applied, that is, regions of two portions near the top vertex and regions of two portions near the bottom vertex of the connecting ring body 20, with high positioning accuracy. As such, a large reverse thrust load can be born by the respective four reinforcement bodies 30 uniformly.

Then, in the case of manufacturing the fan case 9 according to the present embodiment, the reinforcement body 30 made of a Ti alloy is fitted into the notch 22 of the connecting ring body 20 made of an Al alloy fitted and fixed to the rear end of the case main body 10, and then, the reinforcement body 30 is brought into contact with the outward receiving wall 23 of the connecting ring body 20 and is fixed. As such, positioning of the reinforcement body 30 with respect to the case main body 10 in the axial CL direction and the radial direction, respectively, can be made easily with high accuracy.

In addition, as a series of groove finishing is performed on the annular groove 21 of the connecting ring body 20 and the arc-shaped groove 31 of the reinforcement body 30 continuing to each other, the annular groove 21 of the connecting ring body 20 and the arc-shaped groove 31 of the reinforcement body 30 can continue to each other with high accuracy.

A first aspect of the present disclosure has a configuration comprising a cylindrical case main body, and a connecting ring body fitted and fixed to an outer circumferential side of a peripheral wall at a first end of the case main body and having an annular groove open in the centrifugal direction, wherein the connecting ring body has a fitting portion, a reinforcement body is fitted to the fitting portion of the connecting ring body, and the reinforcement body has an arc-shaped groove continuing to the annular groove of the connecting ring body in a state where the reinforcement body is fitted to the fitting portion of the connecting ring body.

In the cylindrical case according to the first aspect of the present disclosure, in the case of a fan case having an annular groove receiving a reverse thrust load from a reverse thrust transmission body, a connecting ring body for connecting with the reverse thrust transmission body is formed as a monolithic body and then a reinforcement body bearing a larger reverse thrust load is fitted to a fitting portion of the connecting ring body. As such, high rigidity can be achieved in the connecting ring body as a whole.

Further, as the reinforcement body is fitted to the fitting portion of the connecting ring body, even if the reinforcement body is connected with the connecting ring body with flanges and screws, an increase in weight can be suppressed and manufacturing cost can be reduced by the amount that a work for forming a lightening hole to reduce weight is unnecessary, compared with the conventional case of connecting all of the two types of angular sectors to a joining shell with flanges and screws.

A second aspect of the present disclosure has a configuration in which the fitting portion of the connecting ring body is a notch open to a side opposite to a second end of the case main body, and the reinforcement body is fitted into the notch of the connecting ring body.

In the case of adopting this configuration, the reinforcement body is well fitted with respect to the monolithic connecting ring body.

A third aspect of the present disclosure has a configuration in which in a state where the reinforcement body is fitted into the notch of the connecting ring body, the reinforcement body on the peripheral wall of the case main body is brought into contact with an outward receiving wall protruding in the centrifugal direction formed on the connecting ring body and is fixed, whereby the reinforcement body is positioned with respect to the case main body in the axial direction and the radial direction, respectively.

In the case of adopting this configuration, the reinforcement body is fitted into the notch of the connecting ring body fitted and fixed to an end of the case main body, and then the reinforcement body is brought into contact with the outward receiving wall of the connecting ring body and fixed. As such, the reinforcement body is positioned with respect to the case main body in the axial direction and the radial direction respectively with high accuracy, and the annular groove of the connecting ring body and the arc-shaped groove of the reinforcement body continue to each other with high accuracy.

Accordingly, in the cylindrical case according to the third aspect of the disclosure, in the case of a fan case having an annular groove receiving a reverse thrust load from a reverse thrust transmission body, for example, it is possible to arrange a reinforcement body made of a Ti alloy with high positioning accuracy to a position suitable for receiving the reverse thrust load of the case main body, which enables the reinforcement body to bear the reverse thrust load uniformly.

A fourth aspect of the present disclosure is configured to be a fan case covering fan blades of an aircraft jet engine.

In this case, it is possible to contribute to reduction in weight and reduction in manufacturing cost while achieving high rigidity of the fan case.

A fifth aspect of the present disclosure has a configuration in which the cylindrical case main body is made of a composite material in which reinforced fiber is impregnated with thermosetting resin, and the connecting ring body is a connecting ring body made of an Al alloy and the reinforcement body is a reinforcement body made of a Ti alloy.

In this case, as the cylindrical case main body is made of reinforced fiber such as carbon fiber, strength and rigidity of the entire case can be secured. In addition, in the case of a fan case having an annular groove receiving a reverse thrust load from a reverse thrust transmission body, for example, it is possible to arrange a reinforcement body made of a Ti alloy to a position suitable for receiving a reverse thrust load of the case main body.

The configuration of the cylindrical case according to the present disclosure is not limited to the embodiment described above. As another configuration, it is acceptable to use a protrusion protruding in the axial direction of the connecting ring body as a fitting portion, and form a recess, to be fitted to the protrusion, on the reinforcement body side, for example.

EXPLANATION OF REFERENCE SIGNS 1 aircraft jet engine
8 reverse thrust transmission body
9 fan case (cylindrical case)
10 case main body
12 peripheral wall
20 connecting ring body made of an Al alloy
21 annular groove
22 notch (fitting portion)
23 receiving wall
30 reinforcement body made of a Ti alloy
31 arc-shaped groove

The invention claimed is:

1. A cylindrical case comprising:
a cylindrical case main body; and
a connecting ring body fitted and fixed to an outer circumferential side of a peripheral wall at a first end of the case main body, the connecting ring body having an annular groove open in a centrifugal direction, wherein
the connecting ring body has a fitting portion,
a reinforcement body is fitted to the fitting portion of the connecting ring body,
the reinforcement body has an arc-shaped groove continuing to the annular groove of the connecting ring body in a state where the reinforcement body is fitted to the fitting portion of the connecting ring body, and
in the state where the reinforcement body is fitted into the fitting portion of the connecting ring body, the reinforcement body on the peripheral wall of the case main body is brought into contact with an outward receiving wall protruding in a centrifugal direction formed on the connecting ring body and is fixed, whereby the reinforcement body is positioned with respect to the case main body in an axial direction and a radial direction, respectively.

2. The cylindrical case according to claim 1, wherein
the fitting portion of the connecting ring body is a notch open to a side opposite to a second end of the case main body, and the reinforcement body is fitted into the notch of the connecting ring body.

3. The cylindrical case according to claim 1, wherein
the cylindrical case is a fan case covering a fan blade of an aircraft jet engine.

4. The cylindrical case according to claim 1, wherein
the cylindrical case main body is made of a composite material in which reinforced fiber is impregnated with thermosetting resin, and the connecting ring body is a connecting ring body made of an Al alloy and the reinforcement body is a reinforcement body made of a Ti alloy.

5. The cylindrical case according to claim 2, wherein
the cylindrical case main body is made of a composite material in which reinforced fiber is impregnated with thermosetting resin, and the connecting ring body is a connecting ring body made of an Al alloy and the reinforcement body is a reinforcement body made of a Ti alloy.

6. The cylindrical case according to claim 3, wherein
the cylindrical case main body is made of a composite material in which reinforced fiber is impregnated with thermosetting resin, and the connecting ring body is a connecting ring body made of an Al alloy and the reinforcement body is a reinforcement body made of a Ti alloy.

7. The cylindrical case according to claim 2, wherein
the cylindrical case is a fan case covering a fan blade of an aircraft jet engine.

8. The cylindrical case according to claim 7, wherein
the cylindrical case main body is made of a composite material in which reinforced fiber is impregnated with thermosetting resin, and the connecting ring body is a connecting ring body made of an Al alloy and the reinforcement body is a reinforcement body made of a Ti alloy.

* * * * *